United States Patent
Puhala et al.

(10) Patent No.: US 7,530,378 B2
(45) Date of Patent: May 12, 2009

(54) SPECKLED TIRE TREADS

(75) Inventors: Aaron Scott Puhala, Kent, OH (US); Rachel Rebekah Barnette, Akron, OH (US); Kenneth Allen Bates, Brunswick, OH (US); Robert Allen Losey, Kent, OH (US); Bruce Raymond Hahn, Hudson, OH (US); Tarah Pecora Shpargel, Solon, OH (US); Richard Michael D'Sidocky, Ravenna, OH (US); Ginger Lee, Ravenna, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 388 days.

(21) Appl. No.: 11/320,093

(22) Filed: Dec. 28, 2005

(65) Prior Publication Data

US 2007/0144643 A1    Jun. 28, 2007

(51) Int. Cl.
B29C 43/20 (2006.01)
B60C 1/00 (2006.01)
B60C 11/00 (2006.01)

(52) U.S. Cl. .............. 152/209.4; 152/211; 264/73; 264/245; 428/207; 428/327

(58) Field of Classification Search .............. 152/209.4, 152/211; 264/73, 75, 76, 77, 245; 428/207, 428/327

See application file for complete search history.

(56) References Cited

U.S. PATENT DOCUMENTS 2,672,910 A * 3/1954 Corson ............... 152/209.4
4,290,470 A    9/1981 Williams et al.
4,352,704 A   10/1982 Williams et al.

(Continued)

FOREIGN PATENT DOCUMENTS

EP         864446    *  9/1998

(Continued)

OTHER PUBLICATIONS

Patent Office of the People's Republic of China, First Office Action, Patent Application No. 200610156266.0, Jul. 18, 2008.

(Continued)

*Primary Examiner*—Steven D Maki
(74) *Attorney, Agent, or Firm*—Wood, Herron & Evans, LLP

(57) ABSTRACT

The present invention is directed towards speckled tire treads for tires. Specifically, the speckled tire tread includes a primary tread compound that serves as a matrix in which is distributed discrete particles of one or more secondary tread compounds, at least one of the compounds is a different color than the other tread compound(s) so as to be visually distinguishable. For example, the primary tread compound may include carbon black pigment and be black in color while the secondary tread compound can include one or more pigments to provide the particles with non-black color. Thus, the colored particles have a visually distinguishable color from that of the primary tread composition. Additionally, at least a portion of the particles may be situated for viewing on a running surface of the tire tread so that a subject can visually distinguish between the compounds, and such observed compounds may provide a different tire performance characteristic(s).

14 Claims, 2 Drawing Sheets

U.S. PATENT DOCUMENTS

| | | | |
|---|---|---|---|
| 4,390,214 A | 6/1983 | Gunter et al. | |
| 4,427,831 A | 1/1984 | Komuro et al. | |
| 4,826,911 A | 5/1989 | Suzuki et al. | |
| 4,970,043 A | 11/1990 | Doan et al. | |
| 5,154,868 A * | 10/1992 | Heckel et al. | 264/245 |
| 5,395,891 A | 3/1995 | Obrecht et al. | |
| 5,425,904 A | 6/1995 | Smits | |
| 5,614,041 A | 3/1997 | Dumke et al. | |
| 5,997,673 A | 12/1999 | Sandstrom et al. | |
| 6,077,874 A | 6/2000 | Wideman et al. | |
| 6,407,180 B1 | 6/2002 | Wideman et al. | |
| 6,462,099 B1 | 10/2002 | Benko et al. | |
| 6,561,244 B2 * | 5/2003 | Zanzig et al. | 152/209.5 |
| 6,660,791 B2 | 12/2003 | Wideman et al. | |
| 6,666,247 B2 | 12/2003 | Iwamura | |
| 7,156,936 B2 * | 1/2007 | Frantz et al. | 152/524 |
| 7,253,225 B2 | 8/2007 | Labauze et al. | |
| 7,255,762 B2 * | 8/2007 | Zanzig et al. | 152/525 |
| 2002/0147257 A1 | 10/2002 | Zanzig | |
| 2004/0094252 A1 | 5/2004 | Galimberti et al. | |
| 2004/0224152 A1 | 11/2004 | Lamoine et al. | |
| 2005/0148713 A1 | 7/2005 | Labauze et al. | |
| 2005/0167019 A1 | 8/2005 | Puhala et al. | |
| 2006/0202378 A1 | 9/2006 | Lamoine et al. | |
| 2008/0073018 A1 * | 3/2008 | Brei et al. | 152/524 |

FOREIGN PATENT DOCUMENTS

| | | | |
|---|---|---|---|
| EP | 1493598 | | 1/2005 |
| GB | 448223 | | 6/1936 |
| GB | 549904 | | 12/1942 |
| GB | 992077 | * | 5/1965 |
| JP | 63-112777 | * | 5/1988 |
| JP | 02-208337 | * | 8/1990 |
| JP | 04-332625 | * | 11/1992 |
| JP | 07-173333 | * | 7/1995 |
| WO | 9931178 | | 6/1999 |

OTHER PUBLICATIONS

European Patent Office, European Search Report, directed to Application No. 06126338, dated Nov. 21, 2008, 7 pages.

* cited by examiner

SPECKLED TIRE TREADS

FIELD OF THE INVENTION

The present invention is directed to tire treads having more than one tread compound, at least one of which is a different color from the other tread compound(s) so as to be visually distinguishable on a surface of the tread.

BACKGROUND OF THE INVENTION

Changing the composition of a tire tread compound, in such a way so as to alter the physical properties thereof, can provide improvements in one area of tire tread performance, yet, reduced performance in other areas. Accordingly, tire tread compositions have been proposed that provide an enhanced performance characteristic but at the expense of other desirable properties. For example, current tire tread compositions may provide enhanced or improved wet traction, yet, have an undesirable effect on treadwear, or vice-versa. Other performance characteristics may also be less than desirable. It would thus be desirable to provide a tread composition that can improve at least one performance characteristic without substantially degrading the other performance characteristic(s).

In addition, tire tread compositions are typically made of rubber compounds having a black color or appearance due to the inclusion of carbon black. Since the tread compounds all have a black appearance, there are no visual cues to indicate that there might be different tire tread compounds in the tire tread composition. Therefore, it would be desirable to provide a tire tread having more than one tread compound in the tire tread, at least one of which is visually distinguishable from the other tread compound(s), and which may provide a tire performance characteristic different than the other tread compound(s) of the tire tread.

SUMMARY OF THE INVENTION

The present invention generally provides for a speckled tire tread having more than one tread compound in the tire tread, at least one of which is a different color than the other tread compound(s) so as to be visually distinguishable. To that end, a primary tread compound serves as a matrix in which is distributed discrete particles of one or more secondary tread compounds. One or more pigments may be included in the primary and/or secondary tread compound(s) to provide at least one of the compounds with coloring that is different from the other compound(s) so that the compounds can be visually distinguishable on the tread surface.

In one embodiment, the speckled tire tread includes a black-colored primary tread compound that serves as a matrix in which is distributed discrete non-black particles of a secondary tread compound. Specifically, the primary tread compound includes carbon black pigment and is black in color while the secondary tread compound includes one or more pigments to provide the particles with a color other than black. Accordingly, the particles are different in color than the primary tread composition, and at least a portion of the colored particles may be viewed on the running surface of the tire tread, thereby providing a visually observable distinction between the primary and secondary compounds. Additionally, the observed secondary tread compound can provide a tire performance characteristic different than the primary tread compound. These tire performance characteristics may include a desired tire traction, handling, tread wear, rolling resistance, etc.

The speckled tire tread of the present invention can contrast with typical tire treads, particularly, a tread cap of a tread of cap/base construction, of a unitary tread running surface. More specifically, as mentioned above, one difficulty of unitary tread running surfaces relates to compromises, or undesirable effects, in tread surfaces utilizing multiple tread compounds having different physical properties for attempting to provide a tread, for example, with both suitable traction and handling. The use of the primary tread compound and discrete particles of a secondary tread compound of the speckled tire tread can help eliminate such undesirable effects.

Other aspects of the invention include methods of making the speckled tire tread composition and a tire including the same.

By virtue of the foregoing, there is thus provided a speckled tire tread having more than one tread compound in the tire tread with at least one compound being distributed within the tire tread as discrete particles, at least one of the tread compounds is different in color than the other tread compound(s) so as to be visually distinguishable.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
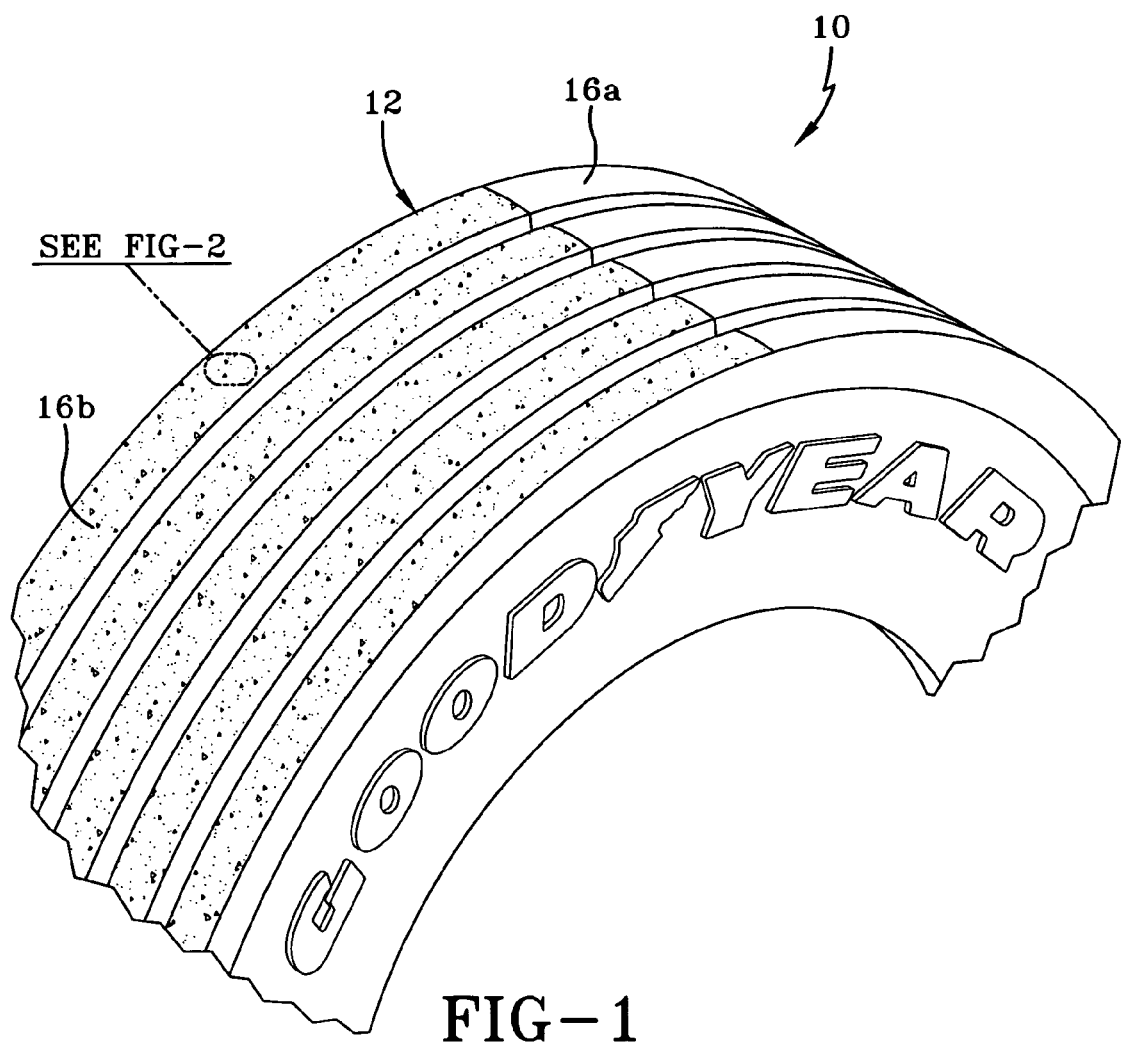
FIG. 1 is a perspective view of a speckled tire tread of the present invention.
Figure 2:
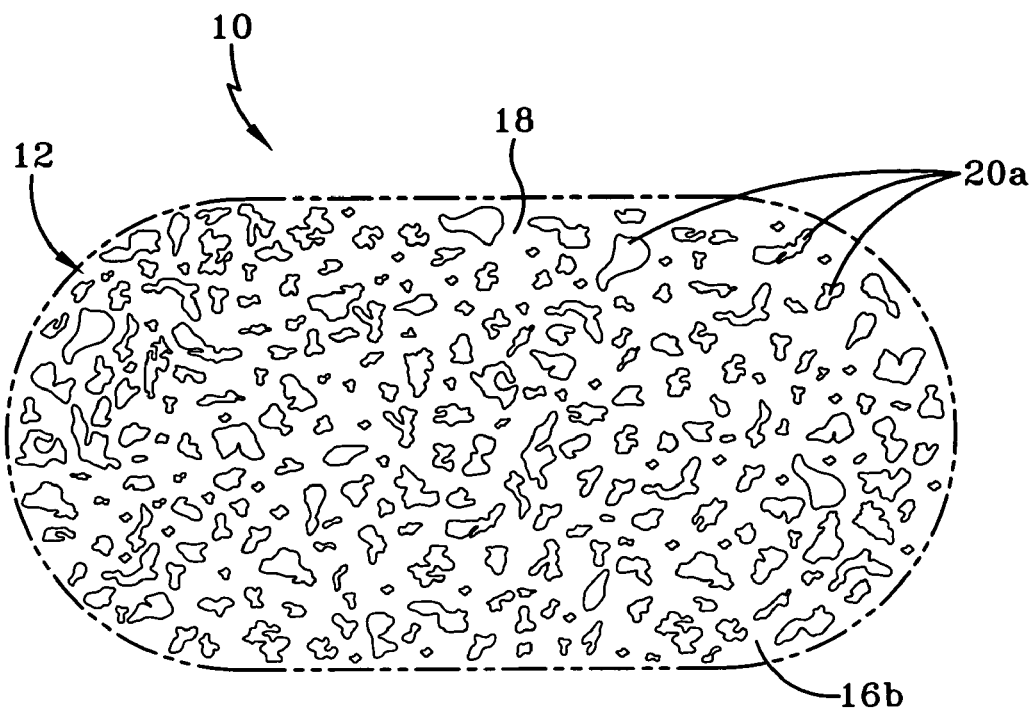
FIG. 2 is an enlarged view of the incircle portion 2 of FIG. 1 showing colored particles on a running surface of the tread.
Figure 3:
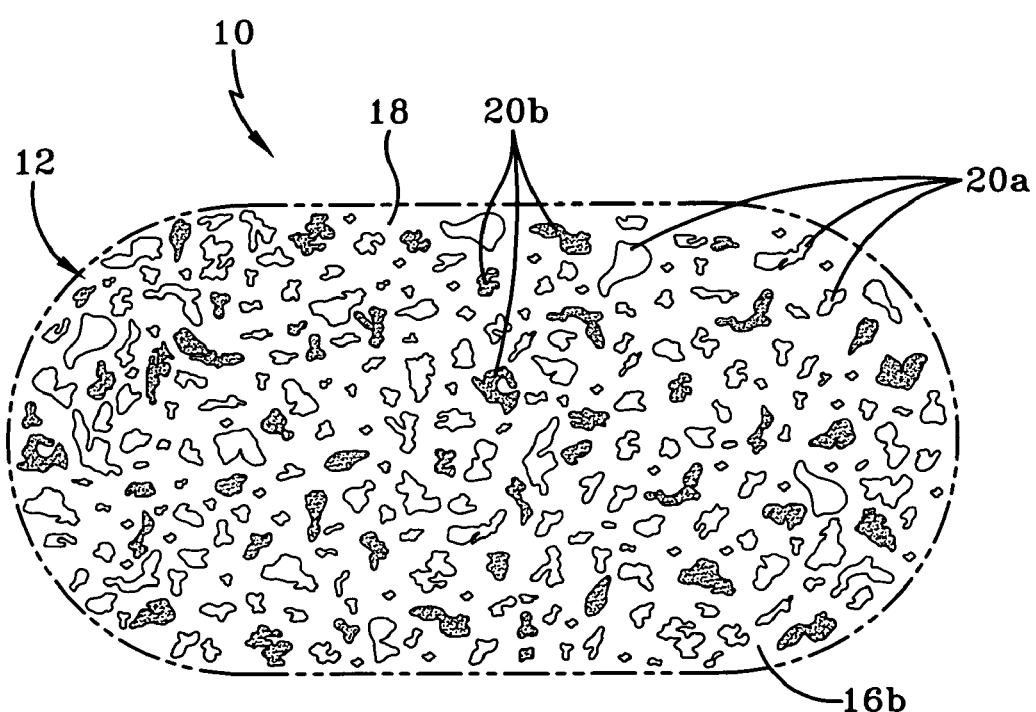
FIG. 3 is an enlarged view of another embodiment of the speckled tire tread of the present invention, similar to FIG. 2, showing first and second colored particles on a running surface of the tread.

The present invention, as shown in FIGS. 1-3, is directed towards a speckled tire tread 10 generally of a cap/base construction, which includes an outer rubber tread cap layer 12 containing an optional initial outer running surface 16*a* (shown in partial) and an underlying rubber tread base layer (not shown). This cap/base construction is an optional construction insofar as the base layer may be excluded to provide a basic tread construction that is well known in the art.

With further reference to FIGS. 1 and 2, the tread layer 12 of the speckled tire tread 10 is comprised of a primary tread compound defining a matrix 18 and being of a desired color. Discrete particles 20*a* of a secondary tread compound, which are of a different color than the primary tread compound, are dispersed throughout at least a portion of the matrix 18 with at least a portion of the particles 20*a* being situated adjacent initial outer running surface 16*a*. The coloring for the tire tread compounds is provided by one or more pigments, as further discussed below. The optional initial outer running surface 16*a*, is shown being devoid of particles 20*a*. However, it should be understood that particles 20*a* may further be dispersed throughout initial outer running surface 16*a* and visible for viewing thereof, such as to provide an observable distinction between the primary and secondary compound.

In addition, it should be further understood that initial outer running surface 16*a* can wear away from tire use or, alternatively, may be removed during tire manufacture, by means known in the art (e.g. by grinding), to reveal an underlying running surface 16b. Accordingly, as further shown in FIG. 2, at least a portion of particles 20a are visible on running surface 16b to provide a visually observable distinction between the primary and secondary tire tread compounds. Thus, it may be understood that the present invention contemplates particles 20a on either the initial outer running surface 16a or a subsequently exposed running surface 16b so that the particles 20a can be visually distinguishable from the primary tread compound.

According to another embodiment of tire tread 10 and with further reference to FIG. 3, tread layer 12 of the speckled tire tread 10 includes particles 20a and 20b, respectively, of first and second secondary tread compounds dispersed throughout at least a portion of the matrix 18. Particles 20b, like particles 20a, can be of a color that is different than the primary tread compound. In addition, each secondary tread compound may include a different pigment than the other so that particles 20a have a different color than particles 20b. Similar to FIG. 2, a portion of particles 20a, 20b are visible on running surface 16b of the tire tread 10 so as to provide a visually observable distinction between the primary and secondary compounds. It should be understood that there may be as many secondary tread compounds as desired.

With continuing reference to FIGS. 1-3, the primary tread compound and secondary tread compound(s) of the speckled tire tread 10 generally include at least one or more conjugated diene-based elastomers. The conjugated diene-based elastomers in the primary and secondary compounds of the present invention may be any suitable elastomer or combination of elastomers. Examples include polybutadiene rubber (including high cis and high vinyl), polyisoprene, natural rubber, isoprene-butadiene copolymer, emulsion-polymerized styrene-butadiene rubber, solution-polymerized styrene-butadiene rubber (including low, mid, and high vinyl), solution-polymerized styrene-isoprene rubber, and solution-polymerized styrene-isoprene-butadiene rubber. In one example, the conjugated diene-based elastomer is a sulfur-vulcanizable elastomer containing olefinic unsaturation. The conjugated diene-based elastomer(s) in the primary compound may be the same as the conjugated diene-based elastomer(s) in the secondary compound(s). Alternatively, the conjugated diene-based elastomer(s) in the primary compound may be different than the conjugated diene-based elastomer(s) in the secondary compound(s).

The coloring pigments of the primary and secondary tread compound(s) can be either inorganic or organic pigments. The organic pigment(s) may be chosen from carbonates, carbon, oxides, sulfides, sulfates, sulfoselenides, silicates, ferrocyanides, chromates, molybdates, metals, or synthetic mixed oxides. The inorganic pigment(s) may be chosen from phthalocyanine, a monoazo, diazo, polycyclic, or metal complex.

In one embodiment, the pigment may be carbon black so as to provide a gray or grayish color, and such carbon black when used to provide a gray or grayish color typically will not be present in an amount greater than about 3 phr. The term "phr," as used herein, refers to parts of a respective material per 100 parts by weight of rubber, or elastomer. In another embodiment, one or more of the tread compounds may be devoid of carbon black so as not to obscure the coloring provided by a non-black pigment. Accordingly, one or more tread compounds of the tire tread 10 may be devoid of carbon black or, alternatively, may be substantially devoid of carbon black insofar as the tread compound(s) includes no more than about 3 phr carbon black. Consequently, to provide black coloring using carbon black pigment, the amount of carbon black in the tread compound, typically, should include no less than about 5 phr. In another example, the amount of carbon black is no less than 5 phr and no more than about 100 phr. In yet another example, the amount of carbon black is about 60 phr.

Additionally, in one example, the pigment may be a red color pigment, such as Red 38, which is a pyrazolone available from Akrochem of Akron, Ohio, such as to provide red colored particles. In another example, the pigment may be a blue color pigment, such as Blue 15, which is a phthalocyanine available from Akrochem of Akron, Ohio, such as to provide blue colored particles. Multiple pigments also may be mixed according to methods known in the art to provide a variety of non-black colors. The amount of pigment(s) in the tread compound(s) may differ depending on the type of pigment, but may generally be an amount effective, as is known in the art, to provide the compound with a visually observable color distinction, such as from the typical black color of a tread compound. By way of example and taking into consideration the carbon black limitations discussed above, the amount of total pigment in a tread compound, e.g. the secondary tread compound, can range from about 0.1 phr to about 8 phr. In another example, the total pigment can range from about 0.5 phr to about 5 phr. In yet another example, the amount of total pigment in a tread compound is about 2 phr.

Additional additives known in the art may be provided in either of the primary and secondary tread compound(s) to provide a desired composition with desired physical properties. Such known and commonly used additive materials are, for example, curing aids such as sulfur, activators, retarders and accelerators, rubber processing oils, resins including tackifying resins, plasticizers, fillers, fatty acid, zinc oxide, silica, silica coupling agents, waxes, antidegradant, antiozonants, and peptizing agents. As known to those skilled in the art, depending on the intended use of the rubbers, the additives mentioned above are selected and commonly used in conventional amounts.

The antidegradant may be any suitable antidegradant of the paraphenylene diamine type as are known in the art. Examples include SANTOFLEX® 6PPD or SANTOFLEX® 6PPD, both available from Flexsys of Akron, Ohio. If desired, the antidegradant may be present in one or more of the tread compounds in an amount of from about 1 phr to about 4 phr.

The non-staining antidegradant of the secondary tread compound(s) may be any suitable non-staining antidegradant of the hindered phenol antioxidant type as are known in the art. Examples include WINGSTAY® L available from Eliokem of Akron, Ohio. If desired, the non-staining antidegradant may be present in the secondary tread compound in an amount of from about 1 phr to about 4 phr.

The amount of silica in the tread compound(s) may be at least about 20 phr. In another example, the amount of silica includes no less than about 20 phr and no more than about 150 phr. In yet another example, the amount of silica is about 90 phr.

The rubber processing oil may include a naphthenic rubber processing oil (free oil) as well as oil contained, for example, in oil extended styrene/butadiene elastomer. The amount of rubber processing oil in one or more of the tread compounds may be no greater than about 60 phr, which includes the total rubber processing oil from each source. In another example, the amount of rubber processing oil includes no less than about 20 phr and no more than about 60 phr. In yet another example, the amount of rubber processing oil is about 35 phr. In another example, the one of the tread compound(s) includes at least about 20 phr more rubber processing oil than the other tread compound(s).

As discussed above, at least a portion of the particles 20a (FIG. 1) or 20a, 20b (FIG. 2) can be visible on the running surface 16b of the tire tread 10 so that a subject can visually distinguish and observe differently colored tread compounds. Additionally, for example, the observed secondary tread compound(s) may provide tire performance characteristics that are different than the primary tread compound and that may be either the same or different from one another. These tire performance characteristics can include a desired tire traction, handling, tread wear, rolling resistance, etc. and are evaluated by means known in the art. By way of example only, the particles 20a may be red in color and exhibit improved wet traction as compared to the primary tread component, and the particles 20b may be blue in color and exhibit improved dry traction as compared to the primary tread component, such primary tread component, for example, being black in color. Alternatively, it should be understood by one skilled in the art that the primary tread compound may be non-black in color, e.g., purple, and/or one or more of the secondary tread compounds may be black in color.

Since the particles 20a, 20b, typically, are non-uniform in nature, their size may be characterized, for example, by their largest dimension, which may be no less than about 500 microns. In another example, the largest dimension of the particles 20a, 20b is no less than about 1000 microns.

In accordance with a method of making the speckled tire tread composition of the present invention for use as speckled tire tread 10, the secondary tread compound(s) is prepared and sufficiently partially cured, by methods known in the art, so as to maintain particle integrity when combined with the primary tread compound as is understood in the art and further discussed below in Examples I and II. The partially cured secondary compound(s) include a pigment, such pigment providing the secondary tread compounds with a color that may be other than black. After partially curing, the respective secondary compound(s) are ground into colored particles 20a (FIG. 1) or 20a, 20b (FIG. 3) by means known in the art, such as via cryogenic grinding. Again, the size of the colored particles 20a, 20b can be characterized by their largest dimension which may be no less than about 500 microns.

The primary tread compound, as also further discussed below in Examples I and II, likewise, is prepared by methods known in the art and includes a pigment, such as to provide a color distinguishable from one or more of the secondary tread compounds. During preparation of the primary tread compound, the partially cured particles 20a (FIG. 2) or 20a, 20b (FIG. 3) are combined, or mixed, with the uncured primary tread compound to form the tire tread composition, which is in a green or uncured state. In one example, the total amount of particles 20a, 20b that are combined with the primary tread compound is in the range of about 5% to about 70% by total weight of the tire tread composition. In another example, the total amount of particles 20a, 20b that are combined is in the range of about 10% to about 50% by total weight of the tire tread composition.

The primary tread compound, which now includes the dispersed, partially cured particles 20a (FIG. 2) or 20a, 20b (FIG. 3), defines a speckled tire tread composition. This speckled tire tread composition is a green rubber that may be formed into a tread shape by methods known in the art and applied to a green tire. The green tire may then be cured or prepared by methods well known to those having skill in the art. Accordingly, the speckled tire treads 10 of the present invention are included on tires (not shown), such as passenger tires.

The speckled tire tread 10 of the present invention, as a result of the process of making, includes initial outer running surface 16a (FIG. 1, shown in partial) and, more specifically, the particles 20a or 20a, 20b (FIG. 3) are dispersed throughout at least a portion of the matrix 18, a portion of the colored particles 20a, 20b being situated adjacent initial outer running surface 16a. If desired, initial outer running surface 16a may be removed from the tire tread 10, such as by grinding, to reveal particles 20a and 20b so that a subject can view a portion of the particles 20a, 20b on running surface 16b and visually distinguish between differently colored tread compounds. If initial outer running surface 16a is not removed in such a manner, the particles 20a and 20b can be viewed on running surface 16b after initial outer running surface 16a is worn away from tire usage. It should also be understood that particles 20a, 20b may be dispersed throughout the initial outer running surface 16a and be visible for viewing thereof, such as to provide an observable distinction between the primary and secondary compound(s).

Non-limiting examples of speckled tire treads 10 for use in tires, and methods of making the tire treads, in accordance with the present invention are disclosed below.

EXAMPLE I

| Material | Primary Tread Compound | Secondary Tread Compound |
| --- | --- | --- |
| Cis 1,4-polybutadiene rubber[1] | 20 | 25 |
| Natural cis 1,4-poly-isoprene rubber | 80 | — |
| Styrene/butadiene rubber (dry weight)[2] | — | 75 |
| Carbon black (N120)[3] | 55 | — |
| Silica[4] | — | 90 |
| Silica coupling agent[5] | — | 8.0 |
| Rubber processing oil[6] | — | 35 |
| Zinc oxide | 2.0 | 2.0 |
| Fatty acid[7] | 1.0 | 2.0 |
| Antidegradant[8] | 2.75 | — |
| Non-Staining Antidegradant[9] | — | 2.75 |
| Wax[10] | 1.5 | 1.5 |
| Sulfur | 1.5 | 1.9 |
| Accelerator(s)[11] | 1.0 | 4.0 |
| Red color pigment[12] | — | 2.0 |

[1]Cis 1,4-polybutadiene rubber obtained by organic solvent solution polymerization having a cis 1,4-content of greater than 95 percent and a Tg (glass transition temperature) of about −105° C. obtained as BUDENE ® 1208 from The Goodyear Tire &Rubber Company.
[2]Styrene/butadiene copolymer elastomer, organic solvent solution polymerization prepared containing about 13 percent bound styrene, having about a 22 percent vinyl content based upon the total elastomer and having a Tg of about −18° C. obtained from The Goodyear Tire &Rubber Company which contained about 37.5 parts by weight extender oil per 100 parts by weight of the elastomer and is reported on a dry weight basis (without the extender oil).
[3]N-120 carbon black, an ASTM designation.
[4]Synthetic, amorphous, precipitated silica obtained as ZEOSIL ™ 1165MP from the Rhodia Company.
[5]A liquid 3-octanoylthio-1-propyltriethoxysilane as NXT ™ Silane from the GE Silicones Company.
[6]Napthenic rubber processing oil (free oil) plus the oil contained in the oil extended styrene/butadiene elastomer.
[7]Primarily stearic acid.
[8]Of the paraphenylene diamine type.
[9]Of the hindered phenol antioxidant type.
[10]A mixture of microcrystalline and paraffin waxes.
[11]N-tert butyl-2-benzothiazyl sulfenamide and diphenyl guanidine.
[12]A pyrazolone obtained as Red 38 from Akrochem of Akron, Ohio.

With reference to Example I, it should be readily understood by those having skill in the art that the secondary tread compound of the speckled tire tread 10 of FIGS. 1 and 2 is compounded by methods generally known in the rubber compounding art, such as by mixing the various constituent materials in the amounts shown above. Accordingly, the red color pigment, i.e, Red 38, provides the secondary tread compound with a red color. After preparation, the red colored secondary tread compound is sufficiently partially cured, then ground into red colored particles 20a (See FIGS. 1 and 2) by means known in the art. The size of the colored particles 20a are characterized by having a largest dimension of no less than about 500 microns.

Next, the primary tread compound is compounded by methods generally known in the rubber compounding art, such as by mixing the various constituent materials in the amounts shown above. During preparation of the primary tread compound, the partially cured colored particles 20a of the secondary tread compound are combined, or mixed, with the primary tread compound to form a green rubber, which defines a speckled tire tread composition. About 10% by weight of the total weight of the tire tread composition of colored particles 20a are added to the primary tread compound. Due to the partial curing, the colored particles 20a are able to maintain particle integrity when mixed with the primary tread compound.

The green rubber may be further formed into speckled tire tread 10 and cured on a tire (not shown) by means well known in the art. Accordingly, the primary tread compound is colored black and defines matrix 18, and red colored particles 20a are dispersed throughout at least a portion of the matrix 18 with at least a portion of the particles 20a being situated adjacent initial outer running surface 16a. As discussed above, viewing of the colored particles 20a on running surface 16b by a subject can occur after initial outer running surface 16a is removed from the tire tread 10, such as by grinding, or after initial outer running surface 16a is worn from tire usage such as to provide an observable distinction between the primary and secondary compound. In addition, colored particles 20a may be dispersed throughout the initial outer running surface 16a and visible for viewing thereof.

Further with respect to Example I, the secondary tread compound is devoid of carbon black so that the red color pigment is not hindered by the black coloring characteristic of carbon black. In contrast, the primary tread compound includes carbon black, which provides the primary tread with its black color. In addition, the secondary tread compound includes a non-staining antidegradant so as not to interfere with the red coloring of the secondary tread compound.

Also, in Example I, the rubber materials, and quantities thereof, in the primary tread compound help provide resistance to treadwear while the rubber materials, silica, and rubber processing oils, and quantities thereof, in the secondary tread compound help provide traction on wet surfaces, as can be determined by testing methods known in the art.

EXAMPLE II

| Material | Primary Tread Compound | Secondary Tread Compound A | Secondary Tread Compound B |
|---|---|---|---|
| Cis 1,4-polybutadiene rubber[1] | 20 | 25 | 80 |
| Natural cis 1,4-poly-isoprene rubber | 80 | — | 20 |
| Styrene/butadiene rubber (dry weight)[2] | — | 75 | — |
| Carbon black (N120)[3] | 55 | — | — |
| Silica[4] | — | 90 | 60 |
| Silica coupling agent[5] | — | 8.0 | 5.33 |
| Rubber processing oil[6] | — | 35 | 40 |
| Zinc oxide | 2.0 | 2.0 | 2.0 |
| Fatty acid[7] | 1.0 | 2.0 | 2.0 |
| Antidegradant[8] | 2.75 | — | — |
| Non-Staining Antidegradant[9] | — | 2.75 | 2.75 |
| Wax[10] | 1.5 | 1.5 | 1.5 |
| Sulfur | 1.5 | 1.9 | 1.9 |
| Accelerator(s)[11] | 1.0 | 4.0 | 4.0 |
| Red color pigment[12] | — | 2.0 | — |
| Blue color pigment[13] | — | — | 2.0 |

[1]Cis 1,4-polybutadiene rubber obtained by organic solvent solution polymerization having a cis 1,4-content of greater than 95 percent and a Tg of about −105° C. obtained as BUDENE ® 1208 from The Goodyear Tire &Rubber Company.
[2]Styrene/butadiene copolymer elastomer, organic solvent solution polymerization prepared containing about 13 percent bound styrene, having about a 22 percent vinyl content based upon the total elastomer and having a Tg of about −18° C. obtained from The Goodyear Tire &Rubber Company which contained about 37.5 parts by weight extender oil per 100 parts by weight of the elastomer and is reported on a dry weight basis (without the extender oil).
[3]N-120 carbon black, an ASTM designation.
[4]Synthetic, amorphous, precipitated silica obtained as ZEOSIL ™ 1165MP from the Rhodia Company.
[5]A liquid 3-octanoylthio-1-propyltriethoxysilane as NXT ™ Silane from the GE Silicones Company.
[6]Napthenic rubber processing oil (free oil) plus the oil contained in the oil extended styrene/butadiene elastomer.
[7]Primarily stearic acid.
[8]Of the paraphenylene diamine type.
[9]Of the hindered phenol antioxidant type.
[10]A mixture of microcrystalline and paraffin waxes.
[11]N-tert butyl-2-benzothiazyl sulfenamide and diphenyl guanidine
[12]A pyrazolone obtained as Red 38 from Akrochem of Akron, Ohio.
[13]A phthalocyanine obtained as Blue 15 from Akrochem of Akron, Ohio.

With reference to Example II, each of the secondary tread compounds A and B of speckled tire tread 10 of FIG. 3, like Example I, are separately compounded by methods generally known in the rubber compounding art, such as by mixing the various constituent materials in the amounts shown above. Accordingly, the red color pigment, i.e., Red 38, provides the secondary tread compound A with a red color while the blue color pigment, i.e., Blue 15, provides the secondary tread compound B with a blue color. After preparation, each of the secondary tread compounds A and B are sufficiently partially cured, then, each compound is ground, respectively, into red colored particles 20a and blue colored particles 20b by means known in the art. The size of the red and blue colored particles 20a, 20b are characterized by having a largest dimension of no less than about 500 microns.

Next, the primary tread compound, like Example I, is compounded by methods generally known in the rubber compounding art, such as by mixing the various constituent materials in the amounts shown above. During preparation of the primary tread compound, the partially cured colored particles 20a, 20b of the secondary tread compounds A and B are mixed with the primary tread compound to form a green rubber, which defines a speckled tire tread composition. About 20% by weight of the total weight of the tire tread composition of colored particles 20a, 20b (10% by weight each) are added to the primary tread compound. Due to the partial curing, the colored particles 20a, 20b are able to maintain particle integrity when mixed with the primary tread compound.

The green rubber may be further formed into speckled tire tread 10 and cured on a tire (not shown) by means well known in the art. Accordingly, the primary tread compound is colored black and defines matrix 18, and the red and blue colored particles 20a, 20b are dispersed throughout at least a portion of the matrix 18 with at least a portion of the colored particles 20a, 20b being situated adjacent initial outer running surface 16a. As discussed above, viewing of the colored particles 20a, 20b on running surface 16b by a subject can occur after initial outer running surface 16a is removed from the tire tread 10, such as by grinding, or after initial outer running surface 16a is worn from tire usage such as to provide an observable distinction between the primary and secondary compound(s). It should also be understood that colored particles 20a, 20b may be dispersed throughout the initial outer running surface 16a and visible for viewing thereof.

Further concerning Example II, each of the secondary tread compounds are devoid of carbon black so that the red and blue color pigment is not hindered by the black coloring characteristic of carbon black. In contrast, the primary tread compound includes carbon black, which provides the primary tread with its black color. In addition, the secondary tread compounds include a non-staining antidegradant so as not to interfere with the red and blue coloring of the secondary tread compounds A and B.

Also, in Example II, the rubber materials, and quantities thereof, in the primary tread compound help provide resistance to treadwear while the rubber materials, silica, and rubber processing oils, and quantities thereof, in the secondary tread compounds A and B, respectively, help provide traction on wet surfaces and on surfaces in cold winter conditions, as can be determined by testing methods known in the art.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A speckled tire tread comprising:
    a tire tread including a primary tread compound defining a matrix and discrete particles of a first secondary tread compound being dispersed throughout at least a portion of the matrix,
    the primary tread compound being of a first color, including no less than about 5 phr carbon black, and being substantially devoid of silica, and
    the first secondary tread compound being of a second color that is different than the color of the primary tread compound, and including a conjugated diene, no more than about 3 phr carbon black, no less than 20 phr silica, and at least about 20 phr more rubber processing oil than the primary tread compound,
    wherein the primary tread compound and secondary tread compound being visually distinguishable by a subject when the particles are viewed on a running surface of the tire tread.

2. The tire tread of claim 1 wherein the first particles have a largest dimension of no less than about 500 microns.

3. The speckled tire tread of claim 1:
    whereby the primary tread compound is black in color, and the first secondary tread compound includes a pigment to provide the first colored particles with a first non-black color to distinguish between the first secondary tread compound and primary tread compound when the first colored particles are viewed on a running surface of the tire tread.

4. The tire tread of claim 3 wherein the first colored particles have a largest dimension of no less than about 500 microns.

5. The tire tread of claim 3 wherein the first secondary tread compound is devoid of carbon black.

6. The tire tread of claim 3 further including second colored particles of a second secondary tread compound dispersed throughout the matrix, the second secondary tread compound including a pigment to provide the second colored particles with a second non-black color different than the first non-black color to distinguish between the first and second secondary and primary tread compounds when the first and second colored particles are viewed on the running surface of the tire tread.

7. The tire tread of claim 6 wherein the first and second secondary tread compounds are devoid of carbon black.

8. A tire comprising the speckled tire tread of claim 1.

9. The tire of claim 8 wherein a portion of the first colored particles are visible on the running surface of the tire tread.

10. A method of making a speckled tire tread comprising:
    preparing a primary tread compound that is substantially devoid of silica and includes no less than about 5 phr carbon black whereby the primary tread compound is black in color;
    combining colored particles of a partially cured secondary tread compound into the primary tread compound to form a speckled tire tread composition, the partially cured secondary tread compound including a conjugated diene, no more than 3 phr carbon black, no less than 20 phr silica, and at least about 20 phr more rubber processing oil than the primary tread compound, the speckled tire tread composition including the particles of the partially cured secondary tread compound dispersed throughout at least a portion of the primary tread compound, the partially cured secondary tread compound further including a pigment to provide the colored particles with a non-black color; and forming a tire tread from the speckled tire tread composition.

11. The method of claim 10 wherein the colored particles have a largest dimension of no less than about 500 microns.

12. The method of claim 10 wherein the secondary tread compound is devoid of carbon black.

13. The method of claim 10 wherein the step of combining colored particles of a partially cured secondary tread compound into the primary tread compound comprises combining colored particles of a first partially cured secondary tread and of a second partially cured secondary tread into the primary tread compound to form a speckled tire tread composition; the composition including the particles of the first and second partially cured secondary tread compounds dispersed throughout at least a portion of the primary tread compound, each of the secondary tread compounds including a pigment to provide the colored particles with non-black color, the colored particles of the first secondary tread compound being different in color than the colored particles of the secondary tread compound.

14. The method of claim 13 wherein the first and second secondary tread compounds are devoid of carbon black.

* * * * *